UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF ALUMINOUS CAKE.

SPECIFICATION forming part of Letters Patent No. 238,613, dated March 8, 1881.

Application filed December 7, 1880. (No model.)

*To all whom it may concern:*

Be it known that I, CONRAD SEMPER, of Philadelphia, State of Pennsylvania, have invented a new and useful Process in the Manufacture of Aluminous Cake or Sulphate of Alumina for Paper-Makers, and other Uses; and I declare the following to be a clear and exact description thereof, sufficient to enable those skilled in the art to which my invention appertains to fully understand and use the same.

My invention consists in a new and useful process of making a white aluminous cake or sulphate of alumina, or other aluminous product, from a ferruginous material, such as bauxite, alum clay, &c., by reducing the salts of ferric oxide contained therein to salts of ferrous oxide, and at the same time neutralizing any free sulphuric acid which may be present, thus producing an article well suited for paper-makers, and other uses.

I employ for this purpose any organic compounds which have the property of reducing the highly-colored ferric-oxide salts into the lower oxide or ferrous-oxide salts, which are colorless, or nearly so. The organic compounds which I preferably use are oxalic acid or oxalates of the alkalies, alkaline earths, or metallic bases, which are added to a solution of sulphate of alumina, produced by the action of sulphuric acid upon bauxite or other ferruginous aluminous compound. In addition to oxalic acid and its salts, other organic substances are also applicable as reducing agents. Oxalic acid and its salts act on the heated solutions of ferruginous sulphate of alumina, to which they are added in proper quantities, either before or after the silica and undecomposed particles of aluminous material have settled out, reducing the peroxide of iron to an almost colorless protoxide of iron, and if any free sulphuric acid be present, the alkalies, alkaline earths, or metallic bases in combination with said oxalic acid will neutralize said sulphuric acid, thus forming a neutral or basic sulphate of alumina.

It is evident that if the solution of sulphate of alumina is acid and it is desirable to produce a neutral or basic product, only the salts of oxalic acid should be used, while in a solution already neutral the free oxalic acid may be used. The solution of sulphate of alumina which has been treated with oxalic acid or other organic compound is then treated in the usual manner to form sulphate of alumina or aluminous cake.

I am aware of the Letters Patent granted to Chadwick and Kynaston, June 15, 1880, in which iron is eliminated from ferruginous aluminous clays by the employment of oxalic acid, and an aluminous cake free from iron and oxalic acid is produced. I do not claim this invention.

Having thus described my invention, I claim and desire to secure by Letters Patent of the United States—

The herein-described process of manufacturing a colorless aluminous cake containing iron salts from ferruginous aluminous sulphate, by treating the ferruginous aluminous sulphate with oxalic acid or oxalates of the alkalies, of the alkaline earths, or of the metallic bases, to convert ferric-oxide salts into ferrous-oxide salts in said cake.

In testimony whereof I have hereunto signed my name this 1st day of December, A. D. 1880.

CONRAD SEMPER.

In presence of—
W. C. STRAWBRIDGE,
J. BONSALL TAYLOR.